United States Patent
Guzik et al.

(10) Patent No.: US 12,030,672 B1
(45) Date of Patent: Jul. 9, 2024

(54) APPARATUS AND METHOD FOR ON-DEMAND RETENTION, RELEASE, AND POSITIONING OF SPACE STRUCTURES AND COMPONENTS OF SAME

(71) Applicant: United States of Americas as represented by the Administrator of NASA, Washington, DC (US)

(72) Inventors: Allen T. Guzik, Strongsville, OH (US); Othmane Benafan, Fairview Park, OH (US); Yu Hin Hau, North Olmsted, OH (US); Linda H. Yoon, North Olmsted, OH (US); Chip Redding, Lakewood, OH (US)

(73) Assignee: United States Government Administrator of NASA, Washington, DC (US)

( * ) Notice: Subject to any disclaimer, the term of this patent is extended or adjusted under 35 U.S.C. 154(b) by 331 days.

(21) Appl. No.: 15/714,014

(22) Filed: Sep. 25, 2017

Related U.S. Application Data

(60) Provisional application No. 62/398,718, filed on Sep. 23, 2016.

(51) Int. Cl.
*B64G 1/00* (2006.01)
*B64G 1/22* (2006.01)
*B64G 1/44* (2006.01)
*F03G 7/06* (2006.01)

(52) U.S. Cl.
CPC ............. *B64G 1/222* (2013.01); *B64G 1/443* (2013.01); *F03G 7/065* (2013.01)

(58) Field of Classification Search
CPC .......... B64G 1/222; B64G 1/443; F03G 7/065
USPC ....................................... 403/28–30; 411/909
See application file for complete search history.

(56) References Cited

U.S. PATENT DOCUMENTS

| | | | | |
|---|---|---|---|---|
| 3,513,429 | A | * 5/1970 | Helsop | H01R 4/10 337/382 |
| 5,095,595 | A | 3/1992 | Stella et al. | |
| 5,674,027 | A | 10/1997 | Warnaar | |
| 6,126,115 | A | 10/2000 | Carrier et al. | |
| 6,425,829 | B1 | * 7/2002 | Julien | B21K 1/56 411/909 |

(Continued)

*Primary Examiner* — Victor L MacArthur
(74) *Attorney, Agent, or Firm* — Robert H. Earp, III; Mark Wolfgang; Trenton J. Roche

(57) ABSTRACT

A system and method for on-demand retention, release, and positioning of structures including space structures (e.g., solar panels, probes, antennae, scientific instruments, fairings, etc.). The system allows for a lightweight and reliable deployment mechanism utilizing shape memory alloy (SMA) technology that allows for structure transition from a stowed to a deployed configuration. SMAs are used for both the active actuation members (e.g., wires) and passive connecting members (e.g., hinges). The retention and release (R&R) mechanism includes the SMA actuator, a static and detachable plate, a pin puller, and retaining latches/hooks. Once released, the deployment and positioning mechanism consists of SMA preloaded hinges and latches. The innovative system and method may be used for deployment of CubeSat and smallsats solar panels, antennae, and the like where volume and power resources are very limited. The innovative system and method may also be used for deployment of components for other classes of small satellites.

11 Claims, 8 Drawing Sheets

(56) References Cited

U.S. PATENT DOCUMENTS

| | | | |
|---|---|---|---|
| 6,543,724 B1 | 4/2003 | Barnett | |
| 6,772,479 B2 | 8/2004 | Hinkley et al. | |
| 6,888,513 B1 | 5/2005 | Graham et al. | |
| 6,997,416 B2 | 2/2006 | Roth et al. | |
| 7,410,129 B2 | 8/2008 | Legrand et al. | |
| 7,806,370 B2 | 10/2010 | Beidleman et al. | |
| 7,926,520 B2 * | 4/2011 | Bogursky | H01R 4/188 140/105 |
| 8,066,227 B2 | 11/2011 | Keller et al. | |
| 8,376,282 B2 | 2/2013 | Keller et al. | |
| 8,387,921 B2 | 3/2013 | Taylor et al. | |
| 8,876,062 B1 | 11/2014 | Baghdasarian | |
| 9,555,904 B2 | 1/2017 | Abrams et al. | |
| 9,856,039 B2 * | 1/2018 | Abrams | B64G 1/66 |
| 2013/0055991 A1 * | 3/2013 | Browne | F02M 26/26 123/568.12 |
| 2014/0042275 A1 * | 2/2014 | Abrams | B64G 1/407 244/172.6 |
| 2016/0290323 A1 | 10/2016 | Cassanelli | |
| 2016/0332752 A1 | 11/2016 | Abrams et al. | |

* cited by examiner

APPARATUS AND METHOD FOR ON-DEMAND RETENTION, RELEASE, AND POSITIONING OF SPACE STRUCTURES AND COMPONENTS OF SAME

CROSS-REFERENCE TO RELATED APPLICATIONS

This application claims the benefit of U.S. Provisional Patent Application Ser. No. 62/398,718 entitled "Smallsats Retention and Deployable Mechanisms Based on Shape Memory Alloys" filed on Sep. 23, 2016, the entirety of which is incorporated by reference herein.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

The general field of this innovation is a system and method for on-demand retention, release, and positioning of a structure such as a space structure (e.g., solar panels, probes, antennae, scientific instruments, fairings, etc.).

BACKGROUND

Retention and deployment devices are key components in vehicles, including most spacecraft, which allow for a change in the configuration of various structures on-demand. Most frequently, these retention and deployment devices are used in large spacecrafts as the design and use of deployment devices in small spacecrafts is difficult due to the limited amount of power and space on the spacecrafts.

The size and cost of spacecraft vary depending on the application. Small spacecraft (i.e., SmallSats) are generally spacecraft with a mass less than 180 kilograms and are about the size of a large kitchen refrigerator. Even with small spacecraft, there is a large variety of size and mass that can be differentiated. A minisatellite is typically between 100-180 kilograms; a microsatellite is between 10-100 kilograms, a nanosatellite is between 1-10 kilograms, a picosatellite is between 0.01-1 kilograms, and a femtosatellite is between 0.001-0.01 kilograms.

One particular small spacecraft frequently used for space research missions is the CubeSat. A CubeSat is a class of nanosatellites that use a standard size and form factor. The standard CubeSat size uses a "one unit" or "1U" measuring 10×10×10 cms and is extendable to larger sizes; 1.5, 2, 3, 6, and even 12U. CubeSats are used by government, industry, and academia as a cost-effective platform for education and space exploration.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in aspects thereof, comprises systems, methods and articles that can include a retention and release (R&R) device and a hinge mechanism.

In one embodiment, the R&R device may comprise a shape memory alloy (SMA) actuator. The SMA actuator may include an SMA element (e.g., a wire, a spring, a coupler, etc.). The R&R device may include some or all of the following elements, at least one retaining hook or latch for securing the R&R device in a locked position, for securing a deployable component (e.g., solar arrays) to the structure (e.g., the CubeSat) and/or the R&R device, a pin puller and bushings, a release plate, guide rails and bushings, and/or attachments hooks/latches.

The hinge mechanism may include an SMA component such as a SMA spring strip. In one embodiment, the hinge mechanism may further comprise some or all of hinge knuckles, a hard stop, bushings, a pin, and/or a latch.

In one embodiment, the SMA actuator may be an SMA wire that can receive and transmit electrical power.

According to an aspect, the innovation provides a method of retaining and deploying a deployable component. The method may comprise securing the deployable component to or within a structure with a retention and release device, wherein the retention and release device comprises a shape memory alloy (SMA) actuator and at least one retaining latch, wherein the SMA actuator is operatively connected to the at least one retaining latch; activating the SMA actuator, wherein activating the SMA actuator comprises sending a command to the SMA actuator causing the SMA actuator to change shape and causes the retaining latch to release the deployable component; and deploying the deployable component.

In one embodiment, deploying the deployable component comprises activating a hinge mechanism. The hinge mechanism may comprise an SMA component operatively connected to or integrally formed with the hinge mechanism, wherein the activation of the SMA component causes the hinge mechanism to actuate the deployable component. In one embodiment, the SMA component is passively activated (e.g., the SMA component undergoes stress-induced transformation). In one embodiment, the method further includes positioning the deployable component by actuating the deployable component via the hinge mechanism until the deployable component reaches a hard stop. Once in position, the deployable component may be secured by latching the deployed deployable component into a final operative position.

In one embodiment, the deployable component is a solar array and the structure is a satellite.

DETAILED DESCRIPTION

Figure 1:
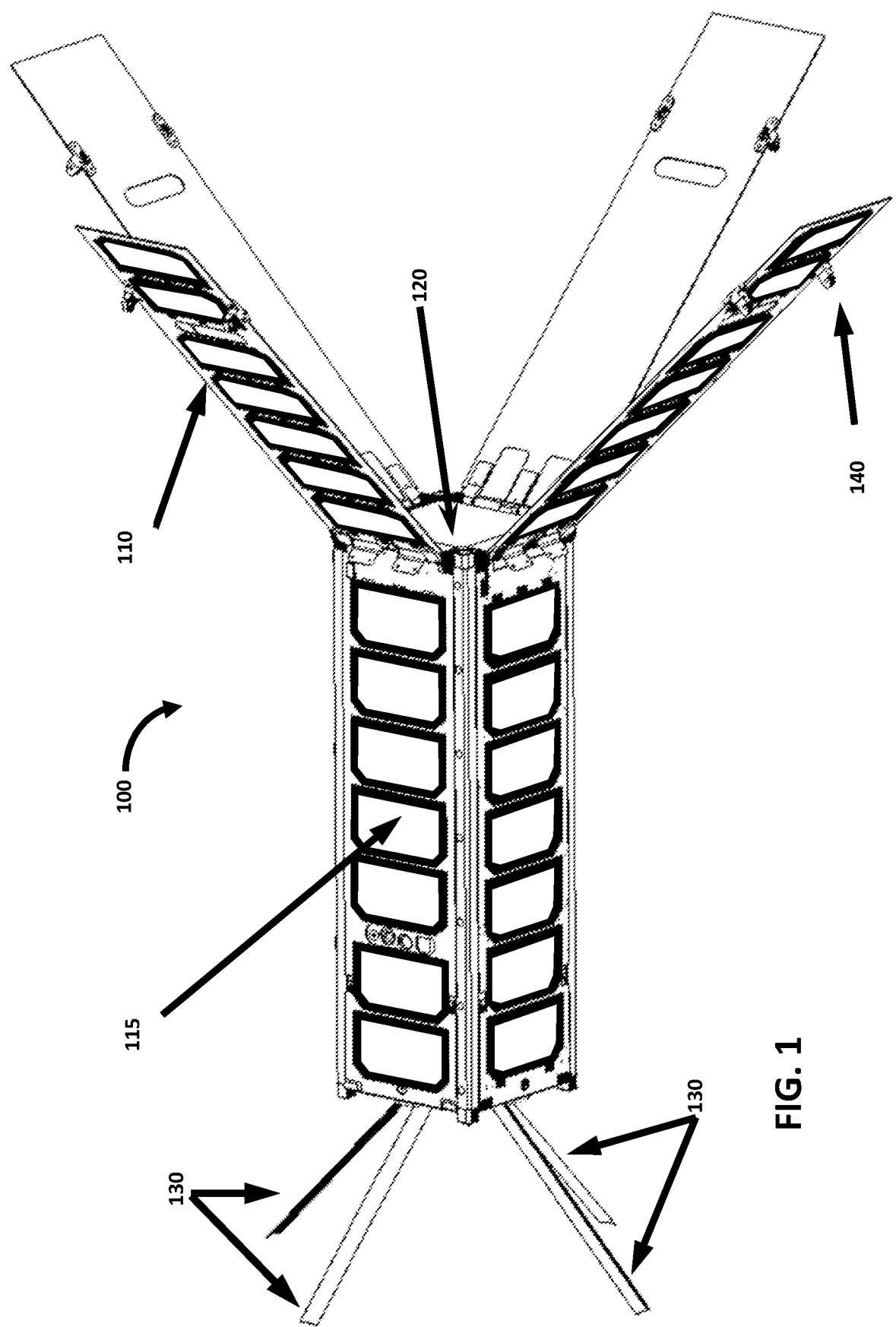
FIG. 1 illustrates a space structure having features of an embodiment 100 of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Retention and deployment devices are key components in vehicles, including most spacecraft, which allow for a change in the configuration of various structures on-demand. Most frequently, these retention and deployment devices are used in large spacecrafts as the design and use of deployment devices in small spacecrafts is difficult due to the limited amount of power and space on the spacecrafts. Thus, there is a need for compact, lightweight and relatively simple deployment devices that can be used for small spacecraft such as small class space vehicles including CubeSats and smallsats. Generally, small class space vehicles are those that are less than about 500 kg in gross weight.

A CubeSat is a U-class small satellite used for space research. A CubeSat is made up of multiples of 10×10×10 cm cubic units, each unit having a mass of no more than 1.33 kilograms. Standard sizes for a CubeSat are 1-U, 2-U, 3-U, and 6-U. CubeSats can be used for many types of space research, including educational missions, scientific research, earth observation, and technology demonstrations. CubeSats may also be find a use for purposes of exploration and communication.

The typical CubeSat operates at between 5-20 watts. According to an aspect of the innovation, use of the retention/deployment device results in an increase the power distribution for the space vehicle—including CubeSats. In one example, the retention/deployment device may be used to deploy a solar array to provide additional power to the CubeSat.

According to an aspect of the innovation, the deployment device may be used with a 3-U CubeSat for reliable solar array deployable mechanisms. In one embodiment, the CubeSat may be used in a technology demonstration mission.

Space craft and space objects (e.g., satellites) often have various components that must be retained and deployed at different points during use. Retention/deployment can be accomplished by various mechanisms, most often for hardware that is too large to fit inside the craft/structure in a deployed state. For example, components such as solar panels, probes, antennae, scientific instruments, fairings, etc., need to be deployed after being stowed. In addition pointing instruments such as cameras, sensors, telescopes, etc., may require retaining/deploying mechanisms.

FIG. 1 depicts a CubeSat 100 having deployable solar array 110, a radiator 120, a solar array latch 140 for securing the solar panels in the stowed position, body mounted solar arrays 115, and antennae 130. Described herein are devices and methods for deploying the deployable solar panels 110. It will be understood that these same devices and methods could be used to deploy most any deployable component, including antennae.

Figure 2:
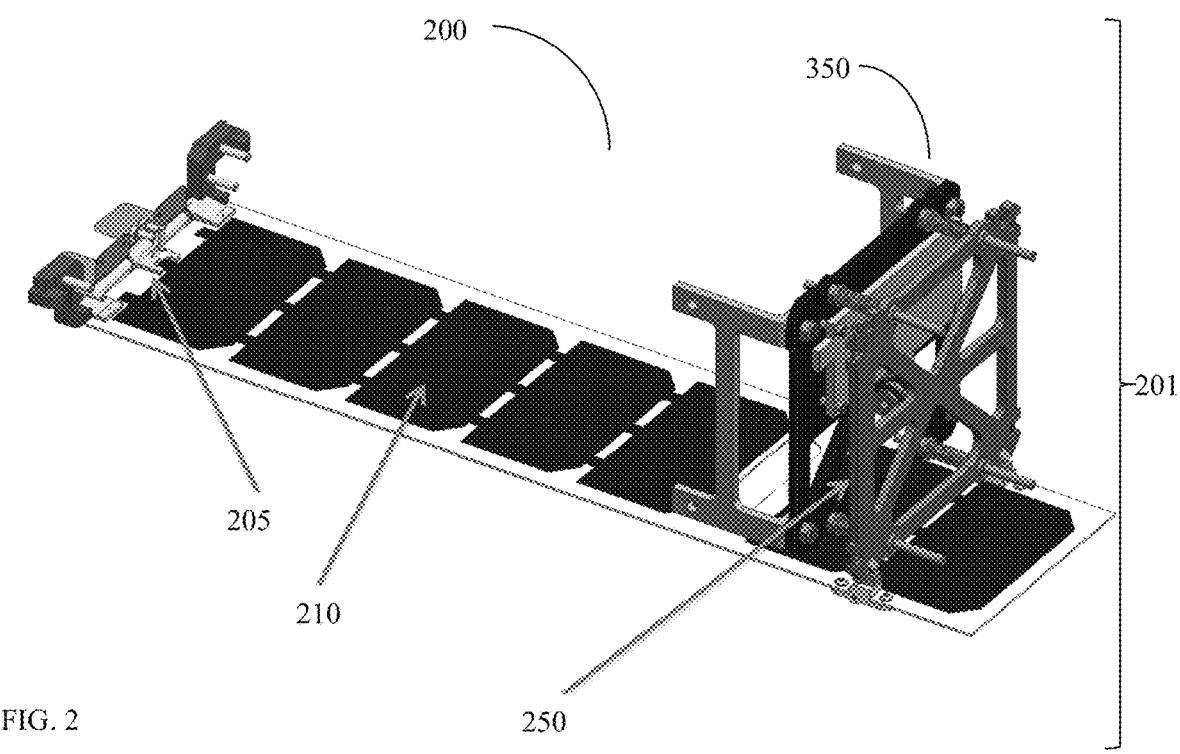
FIG. 2 is a view of a portion of a space structure having features of an embodiment 200 of the innovation.

FIG. 2 illustrates an on-demand retention, release, and positioning apparatus 201 with a view of a single solar array 200 including solar cells 210. This view illustrates an example embodiment of a SMA driven hinge mechanism 205 and a SMA driven retention and release (R&R) device 350. The hinge mechanism 205 may be passively activated (e.g., stress-induced conformational change). The R&R may be activated by heat as described herein.

Current methods for retaining and deploying components include mechanical devices (e.g., DC motor actuators, piezoelectric actuators, dampers), pyrotechnics (e.g., explosive bolts, sep-nuts), burn wires (e.g., a nichrome burn wire mechanism), and large activators that include shape memory alloy technology (e.g., Frangibolt, pinpuler, and hold-down and release mechanisms.). These methods all have drawbacks—they are bulky (e.g., mechanical devices and the large activators), create debris (e.g., pyrotechnics and burn wire), and are a known point of failure (e.g., pyrotechnics). In addition, these mechanism can only be used once and cannot be ground tested. For this reason, the deployment mechanism is a point of failure for space missions.

Current shape memory alloy technology is also limited to materials with activation temperatures from about 0° C. to 100° C. which limits several applicability where colder activation temperature below 0° C. is required (e.g., Mars, eclipses, shadowed moon craters).

There remains a need for smaller, compact, and cost effective mechanisms for deployment of components. These mechanisms should have a high load capacity and provide multifunctional uses (e.g., hinging and structural support). In addition, there remains a need for deployment mechanisms that can be ground-tested.

Shape memory alloys (SMAs) have been used in space applications for over 40 years. SMAs exhibit a solid-to-solid, reversible phase transformation. SMAs can accommodate large strains (e.g., 8% strain). Shape change can generate stresses exceeding 500 MPa.

One advantage to using shape memory alloys for these applications is that SMAs can withstand extreme environments without losing key functionality. Another advantage is that use of SMAs as deployment mechanisms is clean and does not create debris. Yet another advantage of the SMA as a deployment mechanism is that the mechanism is resettable and allows for repeated testing to ensure functionality and safety.

According to an aspect, the innovation utilizes shape memory alloys in the retention and/or deployment of vehicle/craft components. The innovation includes a retention and release (R&R) device and a hinge. In one embodiment, the SMA material can be used to structurally retain a component (e.g., a solar array). An SMA driven hinge may be used in the deployment of the component (solar arrays) to a final position.

The R&R device may comprise many parts including an SMA actuator. In one embodiment, the SMA actuator may comprise an SMA material (e.g., wires, springs, couplers, etc.). The R&R device may also include some or all of the following: pin puller and bushings, a release plate, guide rails and bushings, attachments hoods, and latches.

Figure 3A:
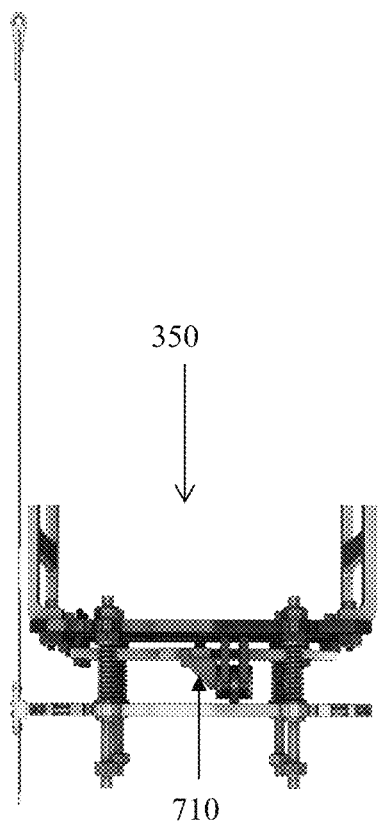
FIGS. 3A-3D depict various stages of use 300 of a retention and release device according to the innovation.
Figure 3B:
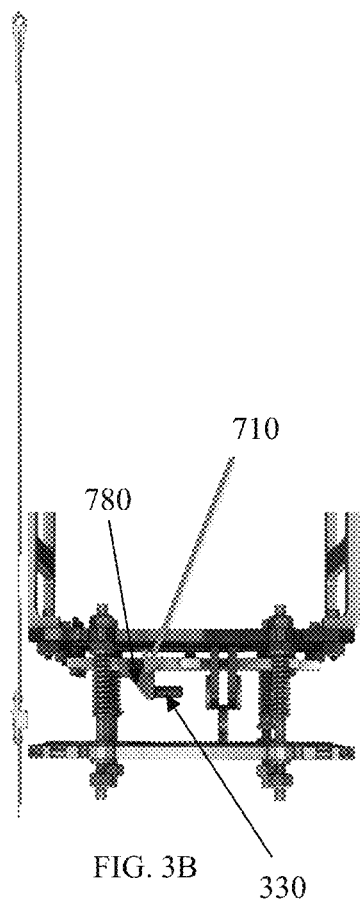
Figure 3C:
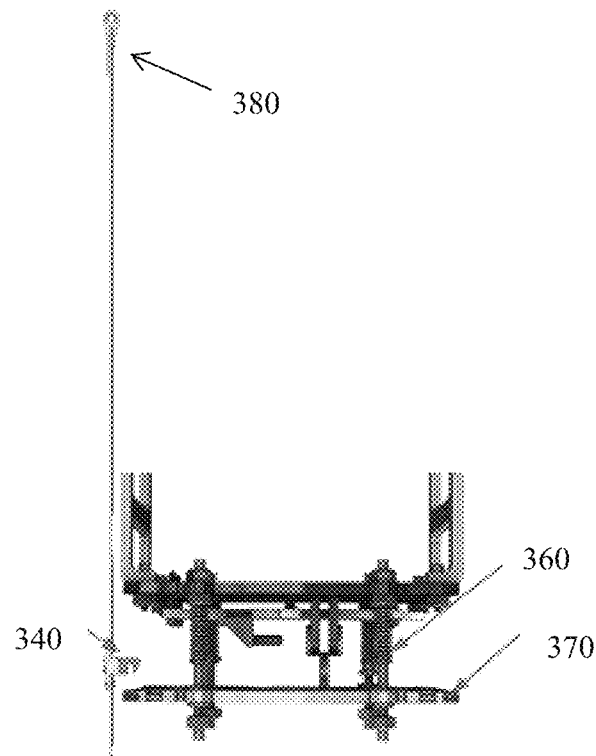
Figure 3D:
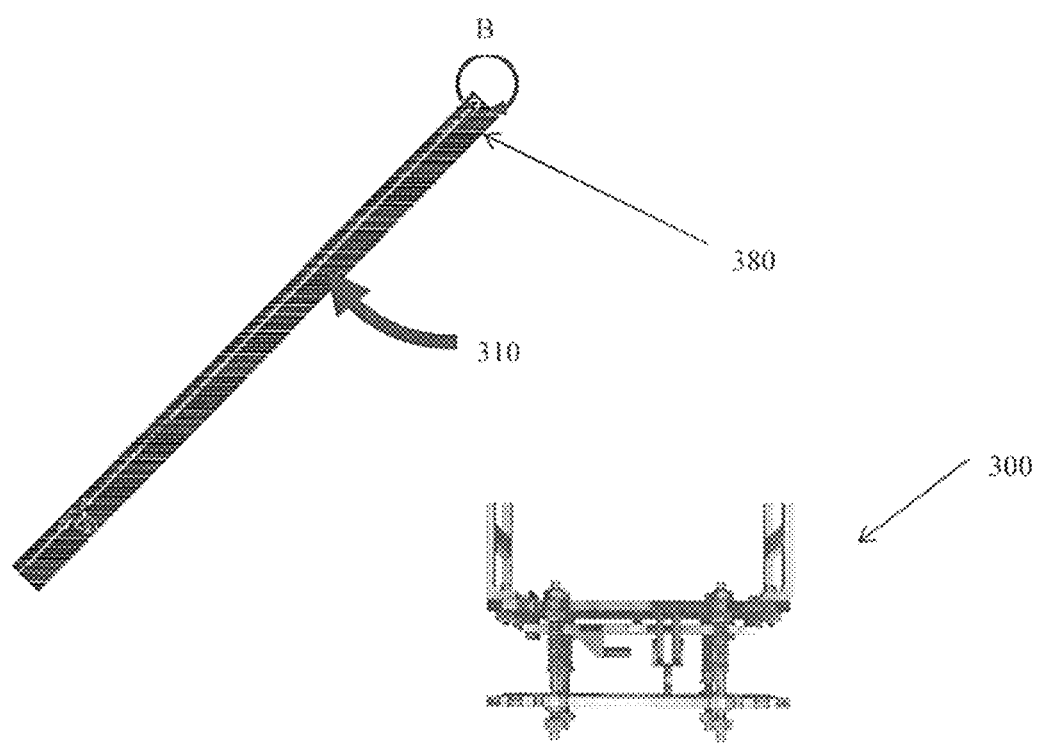

FIGS. 3A-3D depict sequential steps for the deployment of a deployable component (e.g., solar array) from a stowed to a deployed stage. FIG. 3A depicts an R&R device 350 (or in embodiments 600 or 700) according to the innovation in a stowed state with a deployable component attached thereto. FIG. 3B depicts a first stage of release wherein activation of an SMA actuator (for example, 630 or 730) pulls a pin (for example, 330). FIG. 3C depicts a second stage in which, after the pin 330 is pulled, springs (for example, 360) push a release plate (for example, 370, or for other examples 670 or 770). Latches 340 attaching the deployable component 310 are released. FIG. 3D depicts deployment of the deployable component 310, with the arrow showing the direction of deployment. An SMA driven hinge mechanism (for example, 205) opens and positions the solar array 310.

Figure 6:
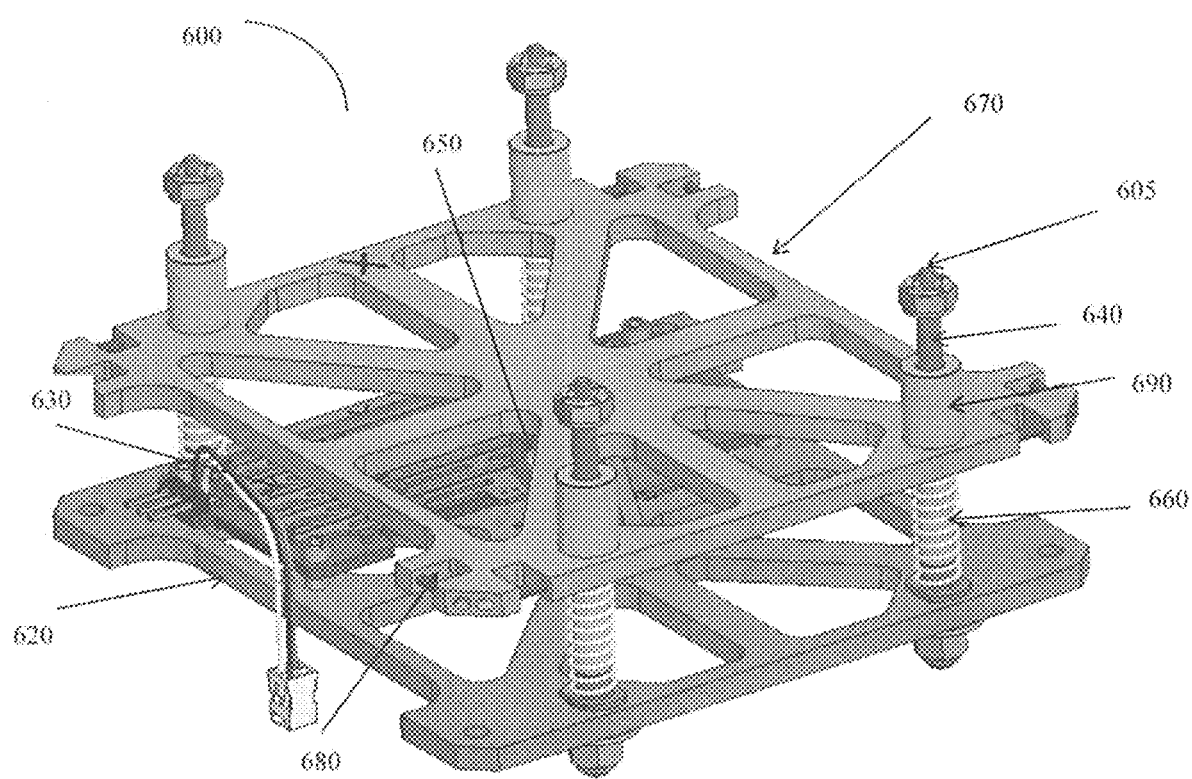
FIG. 6 illustrates an embodiment 600 of a retention and release device according to the innovation.
Figure 7:
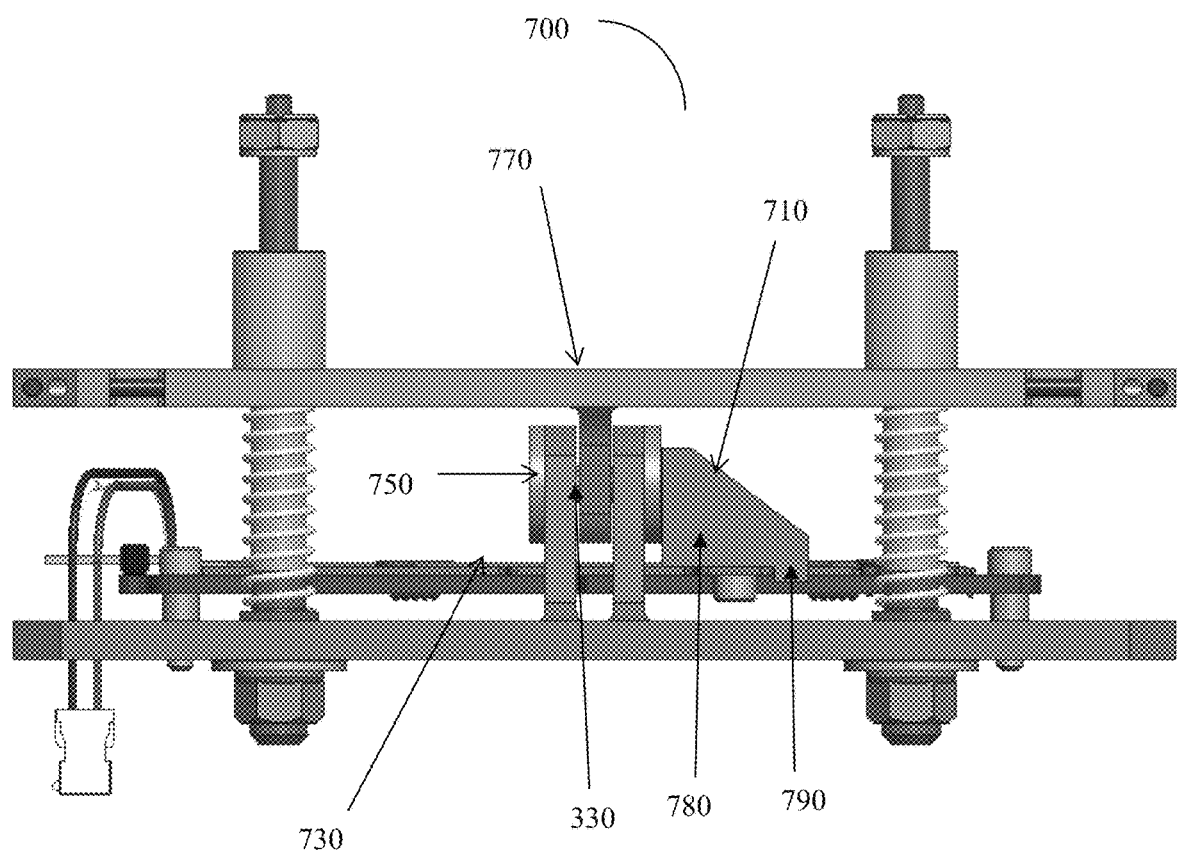
FIG. 7 illustrates an embodiment 700 of a retention and release device according to the innovation.

FIGS. 6 and 7 depict an example embodiment of the R&R device 350 in embodiments 600 and 700) according to the innovation. The R&R device 350 may include a SMA actuator 630, a sliding pin bushing 650, a release plate 670, a plate stopper 605, a sliding rail 640, a sliding rail rod bushing 690, a spring 660, a hook pin 680, and a fixed plate 620, as shown in FIG. 6, with like components (not all called out for clarity) in FIG. 7. Upon activation of the SMA actuator, the sliding pin (see FIG. 7) slides and the device works as depicted in FIGS. 3A-3D.

FIG. 7 depicts an R&R device 350 (in embodiments 600 and 700) according to the innovation in a stowed state. FIG. 7 also depicts the position of the pin 330, sliding pin 710, pin puller 780, and retaining latch or retaining hook 790 (e.g., retaining latch 790 or retaining hook 790) when the R&R device 350 is in the stowed state. The sliding pin 710 has not been released and the plates are in the stowed state. This is similar to FIG. 3A, as contrasted with FIG. 3B for released state.

The hinge according to the innovation may comprise SMA spring strips. In one embodiment, the hinge may also include some or all of the following: hinge knuckles, pivot bracket hard stops, bushings, pins, and a latch.

Figure 4:
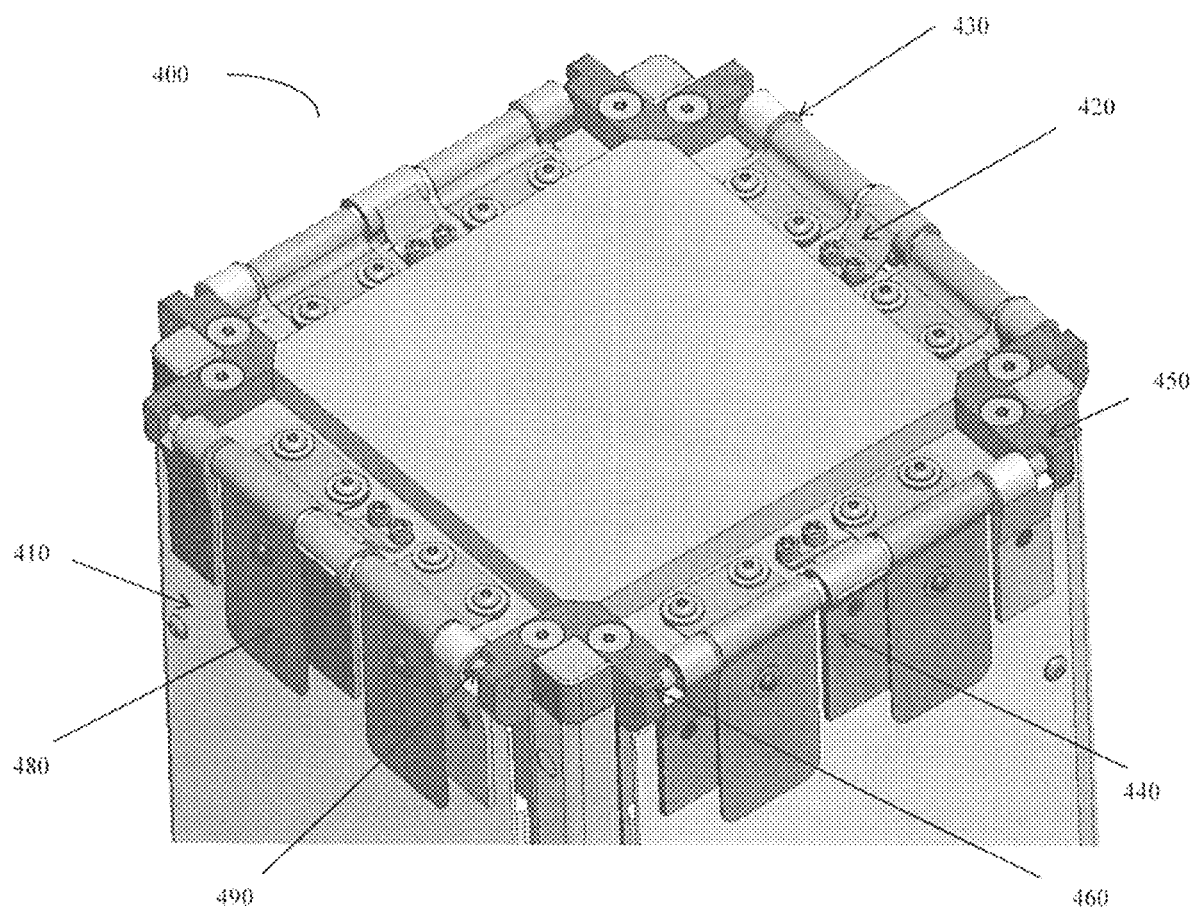
FIG. 4 illustrates an example 400 of a stowed hinge mechanism according to the innovation.
Figure 5:
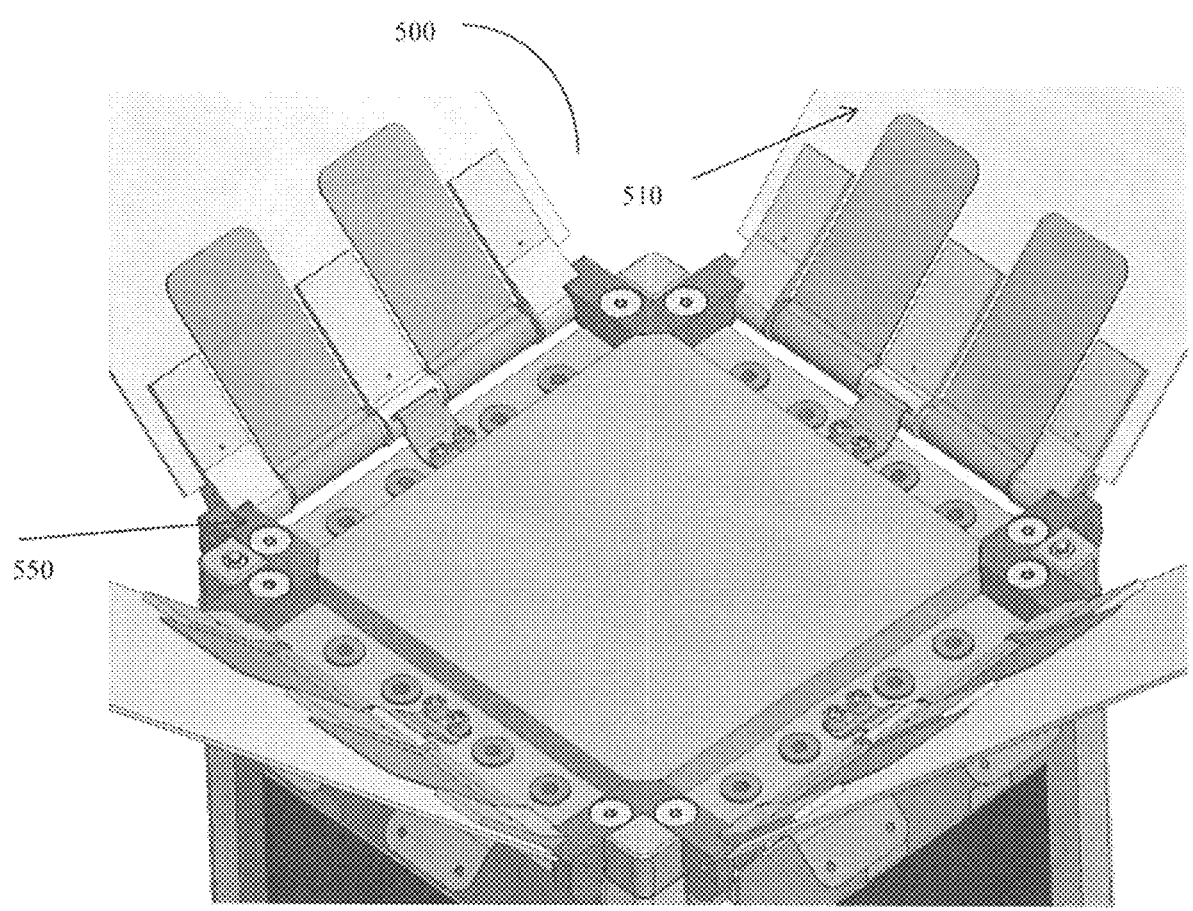
FIG. 5 illustrates an example 500 of a deployed hinge mechanism according to the innovation.

FIGS. 4 and 5 depict use of the hinge mechanism in a stowed state (FIG. 4) and a deployed state (FIG. 5). The hinge mechanism according to an example embodiment of the innovation may include bushings 430, a latch hook 420, a hard stop 450, a latch lug 440, a bracket 460, a hinge pin, and an SMA component. The bushings 430 may be a Vespel busing and may be self lubricating. The SMA component (e.g., SMA spring strips) may be passively activated and may be used to keep the deployable component in a desired deployed position.

FIG. 5 illustrates the hinge mechanism in a deployed state. The deployable component 510 is kept in position, in part by the hinge mechanism, including the hard stop 550.

In one embodiment, the hinge, using the superelastic effect of the SMA material, may be used to transmit electrical power from the solar cells to the space structure (e.g., CubeSat).

According to an aspect, the innovation includes an R&R device and hinge mechanism for retaining and deploying vehicle/craft components. In one embodiment, the device may be operated by locking the device in a stowed state and latching the undeployed component (e.g., folded solar arrays) to the R&R device. At the desired time, a command may be issued to the R&R device to release. In one embodiment, electrical power is supplied to the SMA actuator and the component is deployed. The SMA actuator may be activated by sending electrical current through a series of SMA elements (e.g., wires). When activated, the SMA elements change shape and shrink. As depicted in FIGS. 3A-3D, in an example embodiment of the innovation, the change in shape of the SMA element moves a fastener (e.g., pin) that effectuates the release of the deployable component.

In one embodiment, the SMA material is utilized in a hinge as part of a deployment mechanism for a solar array. The SMA can be attached to the solar array mechanically (e.g., with screws, soldered, attached with epoxy, etc). In one example of the innovation, a shape memory alloy (SMA) material can be used to replace torsion springs used for the deployment of solar arrays for satellites.

In one embodiment, the innovation includes SMAs that replace torsion springs for the deployment of solar arrays. In one embodiment, the solar arrays are a component of a satellite. In one embodiment, multiple components comprising the SMA material replace a torsion spring to introduce redundancy such that the failure of one SMA material does not hinder the deployment of the solar array.

Continuing with this example, a hinge pin and hinge may be used to rotate the solar array to a desired angle to facilitate deployment. Either or both of the hinge pin and the hinge may have rotating surfaces. In one embodiment, the hinge pin and the hinge may have dual rotating surfaces (e.g., pin can rotate and hinge can rotate). The hinge may include a hinge bracket with a hard stop that keeps the component (e.g., solar array) at the desired deployment angle. In one embodiment, at least one locking mechanism per component may be included for redundancy.

According to an aspect of the innovation, a deployment mechanism may include SMA material. In one embodiment, the mechanism includes a passively driven SMA hinge (e.g., an SMA spring loaded hinge as described herein). In one embodiment, deployment takes place in two stages actively driven by an SMA retention/deployment mechanism. First, the SMA is used to free a release plate as shown in FIGS. 3A-3D. Then the component to be deployed (e.g., the solar array) is un-latched as show in FIG. 3C. Active use of the SMA material component requires a phase change of the SMA material via, for example, application of heat.

According to an aspect of the innovation, the SMA material may interface with an electrical power system. The SMA material may comprise conductive patches. In one embodiment, the SMA material may transmit power from a solar array and provide power to other components of a satellite, thus, eliminating the need for a wire harness.

In one embodiment of the innovation, the SMA material component may be bolted to a radiator to a wire lug that carries power to the structure (e.g., the space craft or space structure). In another embodiment, the SMA material component may be soldered directly to a conductive patch on a component (e.g., a copper patch on a solar array). It is to be understood that the SMA material can be used in most any electrical interface to conduct/transmit power.

In one example embodiment of the innovation, the shape memory alloy material may be used to form a hinge such as a deployable array hinge. The deployable array hinge has many applications, including Deployable solar arrays, communication devices such as antennas, observing instruments and sensors. The shape memory alloy material may be superelastic NiTi-based, Cu-based, Fe-based or others alloys that exhibit the superelastic effect (i.e., stress-induced transformation) over a broad range of temperatures ranging from about −40° C. to about 100° C. The shape memory alloy material may be shape-set to 180° from flat sheets and remain superelastic while maintaining the desired properties such as torque and stiffness. The shape memory alloy material may be able to bend up to 180° from flat without permanent damage (e.g., fully reversible deformation); and/or provide the required torques upon deployment as determine from the geometry of the SMA strip. In one example embodiment, the strips provide torques ranging from 0.6 to 1 in-1bf upon deployment (from each strip).

In a specific example, the SMA hinge material may comprise a slightly Ni-rich NiTi composition (e.g., 50.4 to 51 atomic percentage (at. %)). Use of this SMA material can keep the activation temperature below −40° C. In one embodiment, the SMA material is a 50.7 at. % NiTi alloy. Ternary alloying and higher order alloying can also lower the activation temperature. Suitable alloys include NiTiX (X: Nb, Cu, Fe, Co, Cr, Hf, Zr, Sn, V, Si), Cu-based such as CuAlY (Y: Mn, Ni, Be, Ta, Zn, Sn, Si), Fe-based alloys such as FeMnAlNi, FeNiCoTi, FePd, and other alloys.

Shaping of the SMA material to form the deployable array hinge may be accomplished in a multistep process in which a sheet of SMA material is shaped using mandrels with forms that correspond to decreasing step radii. For example, in one embodiment, there are three step radii, the first has a radius of about 0.25 inches; the second has a radius of about 0.15 inches and the third (final) has a radius of about 0.08 inches. The sheet and the mandrel are then heat treated at about 525° C. for 5 minutes and water quenched. It will be understood that heat treatment temperature, time and environment may vary depending on alloy composition.

According to an aspect of the innovation, the SMA material may be formed from superelastic sheets comprising a shape memory alloy. In one embodiment, the shape memory alloy is a NiTi alloy. The sheets may be cut into the shape of the desired component (e.g., a hinge or spring) or it may be cut into strips and then shape of the desired component. The final shape of the component can be made via deformation, a mold, or the like. Once the final shape is made, the shape can be set by heating treating. In one embodiment, the innovation includes a method of making a hinge comprising cutting the shape memory alloy into a hinge shape, shaping the hinge, and heat setting the shaped hinge at a temperature of about 550° C. for 5 minutes. In one embodiment, two sheets of SMA material may be used to provide adequate thickness.

An example R&R device and hinge for deploying solar arrays according to the innovation was fabricated having the following engineering specifications:

R&R mass: 192 grams, scalable for other platforms
Hinge mass: 151 grams for four hinges, scalable to other platforms
R&R SMA activation temperature and range: NiTi—Pt alloy with austenite start temperature of 156° C. (high temperature SMAs available for up to 450° C. activation)
Hinge SMA activation temperature and range: −20° C. (superelastic material)
R&R electrical power requirements: 6 volts, less than 3.0 amps for 5 second activation.
Load capacity: retain and release 4 CubeSat solar arrays weighing approximately 100 grams each. Scalable to other platforms The R&R device and hinge was designed to meet the acceleration spectral density in GSFC-STD-7000A, Table 2.4-3 for components less than 22.7 kg. Peripheral equipment needed include a power or heat source to bring the SMA material up to transition temperature and activate the R&R. In a specific example, the SMA actuator material may comprise NiTi-based composition with ternary and quaternary alloying additions to increase the activation temperature. Suitable alloys include NiTiX (X: Hf, Zr, Pt, Pd, Au), Cu-based, or a combination thereof.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An on-demand retention, release, and positioning apparatus comprising:
   a retention and release device comprising:
      a releasable plate;
      at least one shape memory alloy (SMA) actuator operatively connected to the releasable plate by a pin puller; and
      at least one retaining latch or retaining hook configured to releasably secure a deployable component of a structure, wherein the structure is a CubeSat,
      wherein the at least one retaining latch or the at least one retaining hook fixes the releasable plate in place and, wherein, upon command, the SMA actuator releases the pin puller which releases the releasable plate; and
   at least one SMA driven hinge mechanism, the SMA driven hinge mechanism being passively driven and configured to actuate the deployable component into a final operative position for deployment after the release of the releasable plate,
   wherein the retention and release device retains and releases between 2 and 4 CubeSat solar arrays weighing approximately 100 grams each.

2. The on-demand retention, release, and positioning apparatus of claim 1, wherein the at least one SMA actuator comprises a high temperature NiTi-based alloy with addition of Ta, Pt, Pd, Au, Zr, Hf or any combination thereof.

3. The on-demand retention, release, and positioning apparatus of claim 1, wherein the at least one SMA actuator comprises high temperature ternary or quaternary Cu-based alloys.

4. The on-demand retention, release, and positioning apparatus of claim 1 wherein the at least one retaining latch or retaining hook releasably secures the deployable component to the retention and release device.

5. The on-demand retention, release, and positioning apparatus of claim 4, wherein the releasable plate is adapted to release the deployable component from the retention and release device.

6. The on-demand retention, release, and positioning apparatus of claim 1, wherein the at least one SMA actuator is activated by heat.

7. An on-demand retention, release, and positioning mechanism comprising:
   a retention and release device comprising:
      a releasable plate;
      at least one shape memory alloy (SMA) actuator operatively connected to the releasable plate by a pin puller, the SMA actuator comprising an SMA material configured to interface with an electrical power system, the SMA actuator coupled to a deployable component of a structure,
      wherein the structure is a CubeSat; and
      at least one retaining latch configured to releasably secure the deployable component of the structure,
      wherein the at least one retaining latch fixes the releasable plate in place and, wherein, upon command, the SMA actuator releases the pin puller which releases the releasable plate and deploys a deployable component, and
wherein the SMA material transmits or receives power to or from the electrical power system to or from the deployable component of the structure; and at least one SMA driven hinge mechanism, the SMA driven hinge mechanism being passively driven and configured to actuate the deployable component into a final operative position for deployment after the release of the releasable plate,
wherein the retention and release device retains and releases between 2 and 4 CubeSat solar arrays weighing approximately 100 grams each.

8. The on-demand retention, release, and positioning mechanism of claim 7 wherein the at least one hinge mechanism further comprises a hard stop and a latch for securing the deployable component into the final operative position.

9. The on-demand retention, release, and positioning mechanism of claim 7, wherein the SMA material comprises an SMA wire that can receive and transmit electrical power.

10. The on-demand retention, release, and positioning mechanism of claim 7, wherein the at least one SMA actuator comprises a high temperature NiTi-based alloy with addition of Ta, Pt, Pd, Au, Zr, Hf or any combination thereof.

11. The on-demand retention, release, and positioning mechanism of claim 7, wherein the at least one SMA actuator comprises a high temperature ternary or quaternary Cu-based alloys.

* * * * *